US011139946B2

(12) United States Patent
Nallampattiekambaram et al.

(10) Patent No.: US 11,139,946 B2
(45) Date of Patent: Oct. 5, 2021

(54) DEVICE AND METHOD FOR CANCELLING INTERFERENCE CAUSED BY NON-LINEAR DEVICE

(71) Applicant: Apple Inc., Cupertino, CA (US)

(72) Inventors: Venkatesan Nallampattiekambaram, Hillsboro, CA (US); Yang-Seok Choi, Portland, OR (US)

(73) Assignee: Apple Inc., Cupertino, CA (US)

( * ) Notice: Subject to any disclaimer, the term of this patent is extended or adjusted under 35 U.S.C. 154(b) by 1072 days.

(21) Appl. No.: 15/171,641

(22) Filed: Jun. 2, 2016

(65) Prior Publication Data
US 2017/0353286 A1  Dec. 7, 2017

(51) Int. Cl.
*H04L 5/14*  (2006.01)
*H04B 1/525*  (2015.01)
*H04B 7/0413*  (2017.01)
*H04B 1/48*  (2006.01)
*H04W 88/02*  (2009.01)

(52) U.S. Cl.
CPC ........... *H04L 5/1461* (2013.01); *H04B 1/525* (2013.01); *H04B 7/0413* (2013.01); *H04B 2001/485* (2013.01); *H04W 88/02* (2013.01)

(58) Field of Classification Search
CPC combination set(s) only.
See application file for complete search history.

(56) References Cited

U.S. PATENT DOCUMENTS

| 4,954,732 | A  | * | 9/1990 | Surauer | H03H 21/0001 327/552 |
| 7,224,748 | B2 | * | 5/2007 | Rudolph | H04L 27/361 375/300 |
| 7,283,543 | B1 | * | 10/2007 | Thompson | H04L 12/66 370/401 |
| 2004/0044715 | A1 | * | 3/2004 | Aldroubi | G06T 5/001 708/490 |
| 2006/0015640 | A1 | * | 1/2006 | Denk | H04B 7/269 709/236 |
| 2008/0082597 | A1 | * | 4/2008 | Batruni | H04L 25/03038 708/322 |
| 2010/0217790 | A1 | * | 8/2010 | Yang | H03H 17/0277 708/313 |

(Continued)

OTHER PUBLICATIONS

Liu, W. Principe, J.C., Haykin, S., "Kernel Adaptive Filtering: A Comprehensive Introduction"; Copyright 2010 John Wiley & Sons.

(Continued)

*Primary Examiner* — Xavier S Wong
(74) *Attorney, Agent, or Firm* — Eschweiler & Potashnik, LLC

(57) ABSTRACT

The disclosure relates to a cancellation device for cancelling interference caused by a non-linear device, the cancellation device comprising: an adaptive filter coupled in parallel to the non-linear device, wherein the adaptive filter is configured to filter an input signal of the non-linear device to generate an approximation signal approximating an output signal of the non-linear device; an error signal generator configured to generate an error signal based on a function of the output signal and the approximation signal; and a controller configured to adjust the adaptive filter based on the error signal and a phase and magnitude relation of the output signal and the input signal.

25 Claims, 6 Drawing Sheets

(56) References Cited

U.S. PATENT DOCUMENTS

| | | | |
|---|---|---|---|
| 2012/0140860 A1 | 6/2012 | Rimini et al. | |
| 2014/0301498 A1* | 10/2014 | Rimini | H04B 1/12 |
| | | | 375/285 |
| 2015/0131757 A1* | 5/2015 | Carbone | H03D 1/04 |
| | | | 375/296 |
| 2015/0311929 A1 | 10/2015 | Carbone et al. | |
| 2016/0072531 A1* | 3/2016 | Abrishamkar | G06N 3/04 |
| | | | 455/65 |
| 2016/0072592 A1* | 3/2016 | Tu | H04B 1/406 |
| | | | 375/219 |
| 2016/0072649 A1 | 3/2016 | Tu et al. | |
| 2016/0173165 A1* | 6/2016 | Choi | H04B 1/525 |
| | | | 455/78 |
| 2016/0380653 A1* | 12/2016 | Sheikh | H04B 1/12 |
| | | | 370/282 |

OTHER PUBLICATIONS

European Search Report dated Oct. 20, 2017 for European Patent Application No. 17168900.3.

* cited by examiner

DEVICE AND METHOD FOR CANCELLING INTERFERENCE CAUSED BY NON-LINEAR DEVICE

FIELD

The disclosure relates to cancellation devices and methods for cancelling interference caused by non-linear devices. The disclosure further relates to digital self-interference cancellation in full duplex operation, in particular full duplex operation in mobile communication systems.

BACKGROUND

In a full duplex communication system between two terminals 110, 120, as exemplary illustrated in FIG. 1, a transmitter TX1 of a first terminal 110 transmits a first signal 113 (e.g. in uplink direction) to a second terminal 120, e.g. via a TX1 antenna array 111. A receiver RX2 of the second terminal 120 receives the first signal 113, e.g. via an RX2 antenna array 122. A transmitter TX2 of the second terminal 120 transmits a second signal 123 (e.g. in downlink direction) to the first terminal 110, e.g. via a TX2 antenna array 121. A receiver RX1 of the first terminal 110 receives the second signal 123, e.g. via an RX1 antenna array 112.

During transmission of the first signal 113 by the transmitter TX1 of the first terminal an undesired feedback signal 114 is received at the receiver RX1 of the first terminal 110, e.g. resulting from antenna coupling between TX1 antenna array 111 and RX1 antenna array 112 or even from undesired coupling between the power amplifiers of both antenna arrays 111, 112. This undesired feedback 114 is also referred to as digital self-interference. A similar feedback signal 124 is generated at the second terminal 120.

In order to combat digital self-interference, adaptive filters are used. Such adaptive filters, however, rely on linear channel models. When non-linear components such as power amplifiers are in the signal path as shown in FIG. 1, cancellation performance severely decreases. There is a need to improve the performance of interference cancellation when non-linear components such as power amplifiers are in the signal path.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description.

DETAILED DESCRIPTION

Figure 1:
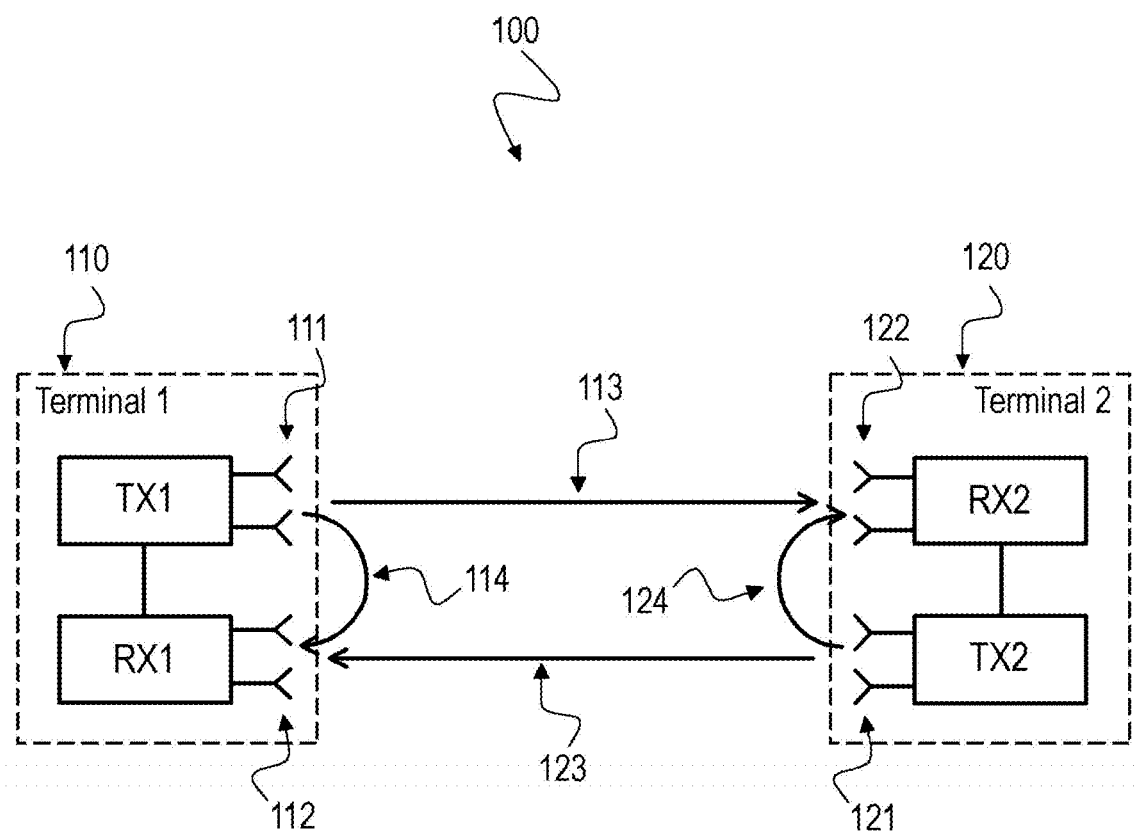
FIG. 1 is a schematic diagram illustrating a communication system 100 exemplary illustrating the generation of self-interference in full-duplex communication.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. However, it may be evident to a person skilled in the art that one or more aspects of the embodiments may be practiced with a lesser degree of these specific details. The following description is therefore not to be taken in a limiting sense. The various aspects summarized may be embodied in various forms. The following description shows by way of illustration various combinations and configurations in which the aspects may be practiced. It is understood that the described aspects and/or embodiments are merely examples, and that other aspects and/or embodiments may be utilized and structural and functional modifications may be made without departing from the scope of the present disclosure.

In addition, while a particular feature or aspect of an embodiment may be disclosed with respect to only one of several implementations, such feature or aspect may be combined with one or more other features or aspects of the other implementations as may be desired and advantageous for any given or particular application. Further, to the extent that the terms "include", "have", "with" or other variants thereof are used in either the detailed description or the claims, such terms are intended to be inclusive in a manner similar to the term "comprise". Also, the term "exemplary" is merely meant as an example, rather than the best or optimal.

The methods and devices described herein may be configured to transmit and/or receive radio signals. Radio signals may be or may include radio frequency signals radiated by a radio transmitting device (or radio transmitter or sender) with a radio frequency lying in a range of about 3 Hz to 300 GHz. The frequency range may correspond to frequencies of alternating current electrical signals used to produce and detect radio waves.

The methods and devices described herein after may be designed in accordance to mobile communication standards such as e.g. the Long Term Evolution (LTE) standard or the advanced version LTE-A thereof. LTE (Long Term Evolution), marketed as 4G, 5G LTE and beyond, is a standard for wireless communication of high-speed data for mobile phones and data terminals. The methods and devices described hereinafter may be applied in OFDM systems. OFDM is a scheme for encoding digital data on multiple carrier frequencies. A large number of closely spaced orthogonal sub-carrier signals may be used to carry data. Due to the orthogonality of the sub-carriers crosstalk between sub-carriers may be suppressed.

In radio communications systems, a transmitter transmitting one or more radio communications signals on one or more radio communications channels may be present. In particular, the transmitter may be a base station or a transmitting device included in a user's device, such as a mobile radio transceiver, a handheld radio device or any similar device. Radio communications signals transmitted by transmitters may be received by receivers such as a receiving device in a mobile radio transceiver, a handheld radio device or any similar device. In particular, radio communications systems as disclosed herein may include LTE systems which may conform to the 3GPP standard for LTE systems. Radio communications signals as disclosed herein may be provided in LTE systems, in particular over radio communications physical channels, such as primary common pilot channels, secondary common pilot channels, dedicated physical channels, dedicated physical control channels or similar channels according to the LTE standard.

The devices and methods described herein may be applied in Single-Input Single Output (SISO) (wireless) communication systems as well as in Multiple-Input Multiple-Output (MIMO) systems. SISO wireless communication systems may employ a single antenna at the transmitter and a single antenna at the receiver for transmitting communication signals. Multiple-Input Multiple-Output (MIMO) wireless communication systems may employ multiple antennas at the transmitter and at the receiver to increase system capacity and to achieve better quality of service. In spatial multiplexing mode, MIMO systems may reach higher peak data rates without increasing the bandwidth of the system by transmitting multiple data streams in parallel in the same frequency band. A MIMO detector may be used for detecting the MIMO channel which may be described by the channel matrices between respective antennas of the transmitter and respective antennas of the receiver.

The devices and methods described herein may apply adaptive filtering for cancelling interference. An adaptive filter is a system with a linear filter that has a transfer function which is controlled by variable parameters and a means to adjust these parameters according to an optimization criterion, e.g. an optimization algorithm. Due to the complexity of the optimization algorithms, most adaptive filters are digital filters. Adaptive filters are used in some applications when some parameters of the desired processing operation are not known in advance or are changing with time. The closed loop adaptive filter applies feedback in the form of an error signal for refining its transfer function. The closed loop adaptive process involves the use of a cost function, which serves as a criterion for optimum performance of the filter, and feeds an adaptive algorithm, which determines how to modify the filter transfer function in order to minimize the cost on the next iteration. The most common cost function is the mean square of the error signal. The filter can be adapted or adjusted for example by using the least mean squares algorithm (LMS) or the recursive least squares algorithm (RLS) or other filter algorithms, i.e. any other algorithm usable for weight optimization in adaptive filter theory.

Figure 2:
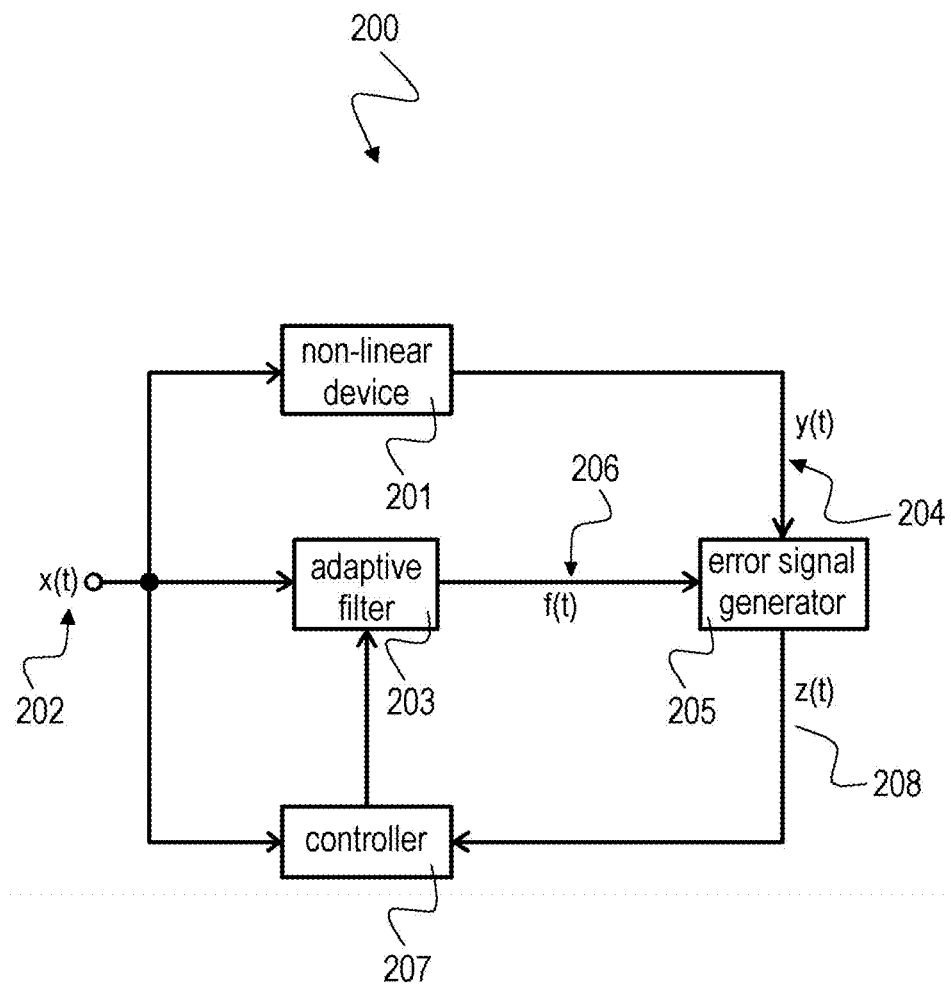
FIG. 2 is a block diagram of a cancellation device 200 in accordance with the disclosure for cancelling interference caused by a non-linear device.

FIG. 2 is a block diagram of a cancellation device 200 in accordance with the disclosure for cancelling interference caused by a non-linear device 201. The cancellation device 200 includes an adaptive filter 203, an error signal generator 205 and a controller 207.

The adaptive filter 203 is coupled in parallel to the non-linear device 201. The adaptive filter 203 filters an input signal x(t), 202 of the non-linear device 201 to generate an approximation signal f(t), 206 approximating an output signal y(t), 204 of the non-linear device 201. The error signal generator 205 generates an error signal z(t), 208 based on a suitably defined metric that is a function of the output signal y(t), 204 and the approximation signal f(t), 206, for example a difference between the output signal y(t), 204 and the approximation signal f(t), 206. The controller 207 adjusts the adaptive filter 203 based on the error signal z(t), 208 and a phase and magnitude relation of the output signal y(t), 204 and the input signal x(t), 202. The error signal generator 205 may be implemented as a subtraction circuit, for example. The controller 207 may use an adaptive algorithm for adjusting the adaptive filter 203.

The phase and magnitude relation may include a phase relation of the output signal y(t), 204 versus the input signal x(t), 202. The phase relation may for example include an angle between the input signal x(t), 202 and the output signal y(t), 204. The phase relation may for example include a real or imaginary part of a product of the input signal x(t), 202 and the conjugate complex output signal y(t), 204. The phase and magnitude relation may include a magnitude relation of the input signal x(t), 202 and the output signal y(t), 204.

The magnitude relation may include a magnitude of a product of the input signal x(t), 202 and the conjugate complex output signal y*(t), 204. The magnitude relation may include an exponential function of the magnitude of the product of the input signal x(t), 202 and the conjugate complex output signal y*(t), 204.

The phase and magnitude relation may include a multiplicative combination of a phase function of the output signal y(t), 204 and the input signal x(t), 202 and a magnitude function of the output signal y(t), 204 and the input signal x(t), 202. The phase and magnitude relation may include a continuous symmetric positive-definite function of the output signal y(t), 204 and the input signal x(t), 202 as described below.

The phase and magnitude relation may include a kernel function of the input signal x(t), 202 and the output signal y(t), 204. The kernel function may be a function of a complex-valued input signal x(t), 202 and a complex-valued output signal y(t), 204. The kernel function of the input signal x(t), 202 and the output signal y(t), 204 may be as follows: $\kappa(x,y)=\text{real}(xy^*)\exp(\beta|xy^*|)$ as described below.

The adaptive filter may include a Kernel Adaptive Filter. The controller may adjust the adaptive filter based on one of a recursive least squares (RLS) or a least mean squares (LMS) algorithm or any other algorithm usable for weight optimization in adaptive filter theory.

The input signal x(t), 202 may include an orthogonal frequency division multiplex (OFDM) signal. The non-linear device may for example include a power amplifier. The interference caused by the non-linear device may include amplitude modulation (AM)—amplitude modulation (AM) and/or amplitude modulation (AM)—phase modulation (PM) distortion.

Figure 3:
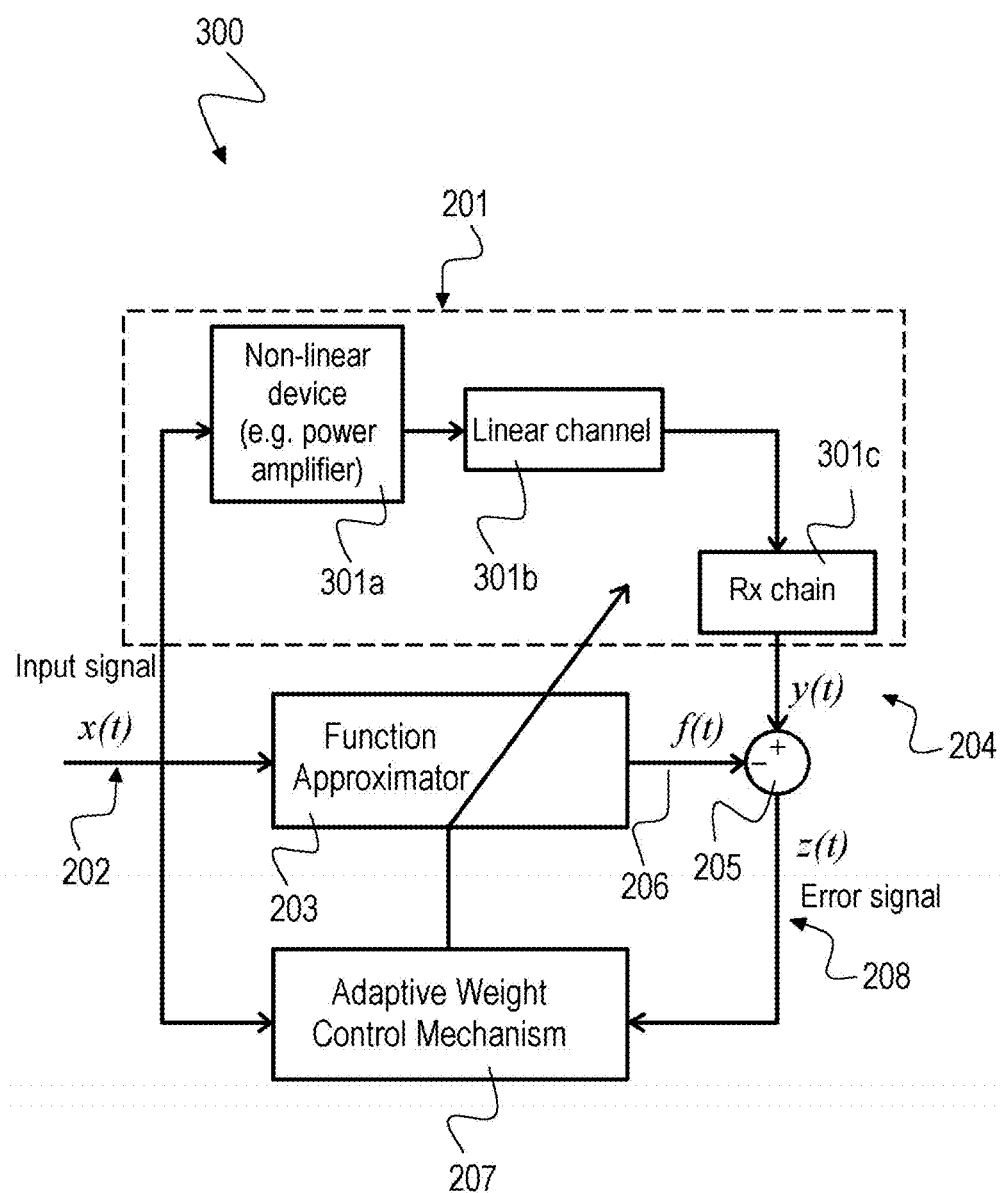
FIG. 3 is a block diagram of a cancellation device 300 in accordance with the disclosure for cancelling interference caused by a signal path including a non-linear device, a linear channel and an RX chain.

FIG. 3 is a block diagram of a cancellation device 300 in accordance with the disclosure for cancelling interference caused by a signal path including a non-linear device, a linear channel and an RX chain.

The cancellation device 300 is an implementation of the cancellation device 200 described above with respect to FIG. 2. The non-linear device 201 depicted in FIG. 2 may include a power amplifier 301a, a linear device such as a linear channel 301b and a receiver (RX) chain 301c. If only one component 301a in such a signal path 301a, 301b, 301c is non-linear, e.g. a non-linear power amplifier 301a, the whole signal path can be represented as a non-linear device 201. The adaptive filter 203 as described above with respect to FIG. 2 can be represented as a function approximator 203. The controller 207 as described above with respect to FIG. 2 can be represented as an adaptive weight control mechanism 203. The error signal generator 205 as described above with respect to FIG. 2 can be represented as a subtraction device 205.

The cancellation device 300 includes a kernel adaptive filter (KAF) 203, an error signal generation circuit, e.g. implemented as a subtracting circuit 205 and a controller 207. The kernel adaptive filter 203 is coupled in parallel to the non-linear device 201. The KAF 203 is configured to filter an input signal x(t), 202 of the non-linear device 201. The error signal generation circuit generates an error signal based on a function of the output signal of the non-linear device and the approximation signal. When the error signal generation circuit is implemented as subtracting circuit 205, the subtracting circuit 205 subtracts an output signal f(t), 206 of the KAF 203 from an output signal y(t), 204 of the non-linear device 201 to generate an error signal z(t), 208. The controller 207 adjusts the KAF 203 based on an adaptive algorithm depending on the error signal z(t), 208 and a kernel function of the input signal x(t), 202 and the output signal y(t) 204.

The kernel function may be a function of complex-valued input and output signals x(t), 202, y(t), 204. The kernel function may include a first part which is based on a phase between the input signal x(t), 202 and the output signal y(t), 204 and a second part which is based on a magnitude of the output signal y(t), 204 and a magnitude of the input signal x(t), 202. The kernel function of the input signal x(t), 202 and the output signal y(t), 204 may be as follows: $\kappa(x,y)=\text{real}(xy^*)\exp(\beta|xy^*|)$.

In the implementation of the cancellation device 300 depicted in FIG. 3, the function approximator 203 may be implemented by a kernel adaptive filter (KAF). The adaptive weight control mechanism 207 may be based on an adaptive algorithm depending on a kernel function as described in the following.

The kernel adaptive filter is a type of nonlinear adaptive filter, i.e. a filter that adapts its transfer function to changes in signal properties over time by minimizing an error or loss function that characterizes how far the filter deviates from its ideal behavior. The adaptation process is based on learning from a sequence of signal samples and can be implemented by an adaptive algorithm. The transfer function of a non-linear adaptive filter is nonlinear. Kernel adaptive filters implement a nonlinear transfer function using kernel methods. In these methods, the signal is mapped to a high-dimensional linear feature space and a nonlinear function is approximated as a sum over kernels, whose domain is the feature space. If this is done in a reproducing kernel Hilbert space, a kernel method can be a universal approximator for a nonlinear function. Kernel methods have the advantage of having convex loss functions, with no local minima, and can be implemented with only moderate complexity. Because a high-dimensional feature space is linear, kernel adaptive filters can be represented as a generalization of linear adaptive filters. For adapting a KAF, the least mean squares filter (LMS) and the recursive least squares filter (RLS) can be used, for example.

The kernel method is a powerful nonparametric modeling tool. The main concept of the kernel method is to transform the input data into a high-dimensional feature space via a reproducing kernel such that the inner product operation in the feature space can be computed efficiently through the kernel evaluations. Then, appropriate linear methods can be subsequently applied on the transformed data. As long as an algorithm can be formulated in terms of inner products (or equivalent kernel evaluation), there is no need to perform computations in the high-dimensional feature space. Even though this methodology is called the "kernel trick", the underlying reproducing kernel Hilbert space plays a central role in providing linearity, convexity, and universal approximation capability.

In the following a new set of kernels is described termed as "modified-exponential" or "mod-exp" kernels which can be used in conjunction with a new class of algorithms which are based on Kernel Adaptive Filters for interference cancelation. Using this technique, the input signal can be transformed into an appropriate much higher nonlinear dimension (potentially infinite dimension) while retaining the complexity of existing solutions. This results in higher suppression, faster convergence rates and lower sampling requirements.

The KAF implementation of the cancellation device 300 can be derived from adaptive filter techniques as described in the following. x(t), 202 is the input signal at the transmitter that is passed through power amplifier 301a and transmitted while y(t), 204 is the received signal which is an echo of the transmitted signal 202 after passing through a channel 301b. The function approximator 203 needs to model the PA 301a and the channel 301b and the received echo signal 204 needs to be cancelled.

Non-linear adaptive filters consider algorithms of the form:

$$f(t)=f(t-1)+\text{Gain}(t)z(t)$$

Linear filters have the following form:

$$f(t)=w(t)^\tau x(t).$$

In most systems, non-linear features are explicitly extracted from x(t) and linear filtering is applied on top of this. However, this restricts the dimensionality of the mapping.

Techniques according to the disclosure use a class of filters known as Kernel Adaptive Filters (KAF) with a new kernel design as described in the following. KAF avoids explicit mapping into higher dimensions and works with implicit mapping that provides the advantage of working in much higher dimensions (potentially infinite). Methods and devices according to the disclosure provide the flexibility of working in infinite dimensional spaces at a comparable complexity.

A kernel in this context is a continuous symmetric positive-definite function $\kappa: X \times X \to R$, where X is the input domain. A Gaussian kernel can be written as:

$$\kappa(x,x')=\exp(-a\|x-x'\|^2).$$

A polynomial kernel can be written as:

$$\kappa(x,x')=\exp(x^\tau x'+1)^p.$$

$\phi(t)$ is referred to as the explicit feature mapping of the signal x(t). The LMS updates for the weights in this case can be obtained as follows:

$$w(t)=w(t-1)+\eta x(t)(y(t)-w(t-1)^\tau x(t));$$

$$w(t)=w(t-1)+\eta x(t)z(t)$$

$$w(t)=\eta \Sigma_{i=1}^t(z(i)x(i))$$

Replacing by x(i) by $\phi(i)$ results in:

$$w(t)=\eta \Sigma_{i=1}^t(z(i)\phi(i))$$

$$w(t)^\tau \phi(\tau)=\eta \Sigma_{i=1}^t(z(i)\phi^\tau(i)\phi(\tau))=\eta \Sigma_{i=1}^t(z(i)\kappa(x(i),x(\tau)))$$

$$f_t=f_{t-1}+\eta z(t)\kappa(x(t)\ldots)$$

Thus the function updates only depend on the kernel $\kappa(x(t)\ldots)$ without explicit need to map into the feature space. Depending on the choice of the kernel the feature mapping can be (potentially) infinite.

Prior kernels in KAF have failed to model AM-PM distortions and in general non-linear distortions of complex signals. To effectively model non-linear distortions of complex signals, in particular the PA non-linearity such as AM-AM and AM-PM distortion, new kernels of the form $$g_1(xy^*)g_2(|xy^*|)$$

are introduced, where $g_1$ and $g_2$ are continuous functions. An example of this function is $$\kappa(x,y) = \text{real}(xy^*)\exp(\beta|xy^*|)$$

This kernel has the advantage of capturing the magnitude and phase nonlinear effects. While existing kernels in the literature are focused on real signals, this new kernel can efficiently operate on complex-valued signals. The new kernel maps the input signal to a (potentially) infinite dimension thereby allowing for better modeling.

Figure 4:
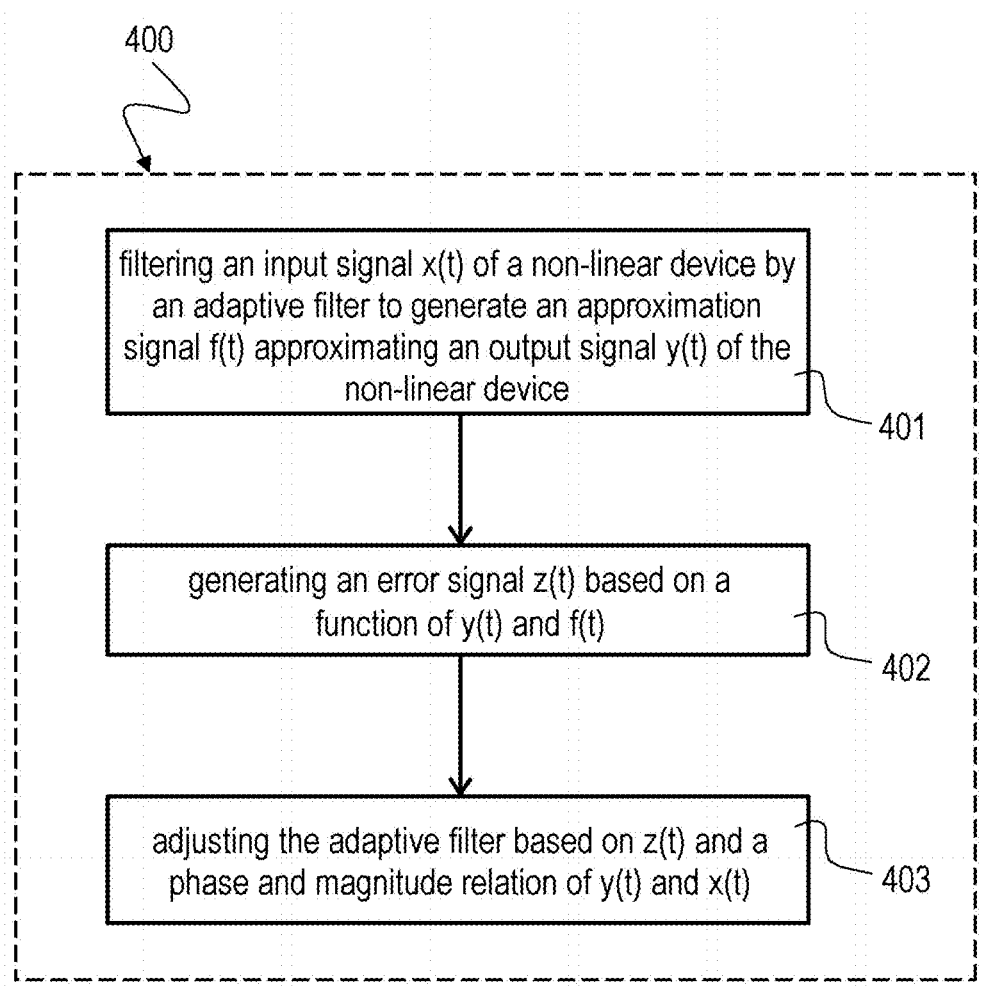
FIG. 4 is a schematic diagram of a method 400 in accordance with the disclosure for cancelling interference caused by a non-linear device.

FIG. 4 is a schematic diagram of a method 400 in accordance with the disclosure for cancelling interference caused by a non-linear device. The method 400 includes filtering 401 an input signal (e.g. x(t) according to FIGS. 2 and 3) of the non-linear device by an adaptive filter to generate an approximation signal (f(t) according to FIGS. 2 and 3) approximating an output signal (y(t) according to FIGS. 2 and 3) of the non-linear device. The method 400 includes generating 402 an error signal (z(t) according to FIGS. 2 and 3) based on a function of the output signal y(t) and the approximation signal f(t), for example a difference between the output signal y(t) and the approximation signal f(t). The method 400 includes adjusting 403 the adaptive filter based on the error signal z(t) and a phase and magnitude relation of the output signal y(t) and the input signal x(t).

The phase and magnitude relation may include a function of a product of the input signal x(t) and the conjugate complex output signal y(t), e.g. as described above with respect to FIG. 3. The phase and magnitude relation may include a kernel function of the input signal x(t) and the output signal y(t), e.g. as described above with respect to FIG. 3. The kernel function may be a function of a complex-valued input signal x(t) and a complex-valued output signal y(t). The kernel function of the input signal x(t) and the output signal y(t) may be $\kappa(x,y) = \text{real}(xy^*)\exp(\beta|xy^*|)$, as described above with respect to FIG. 3.

Figure 5:
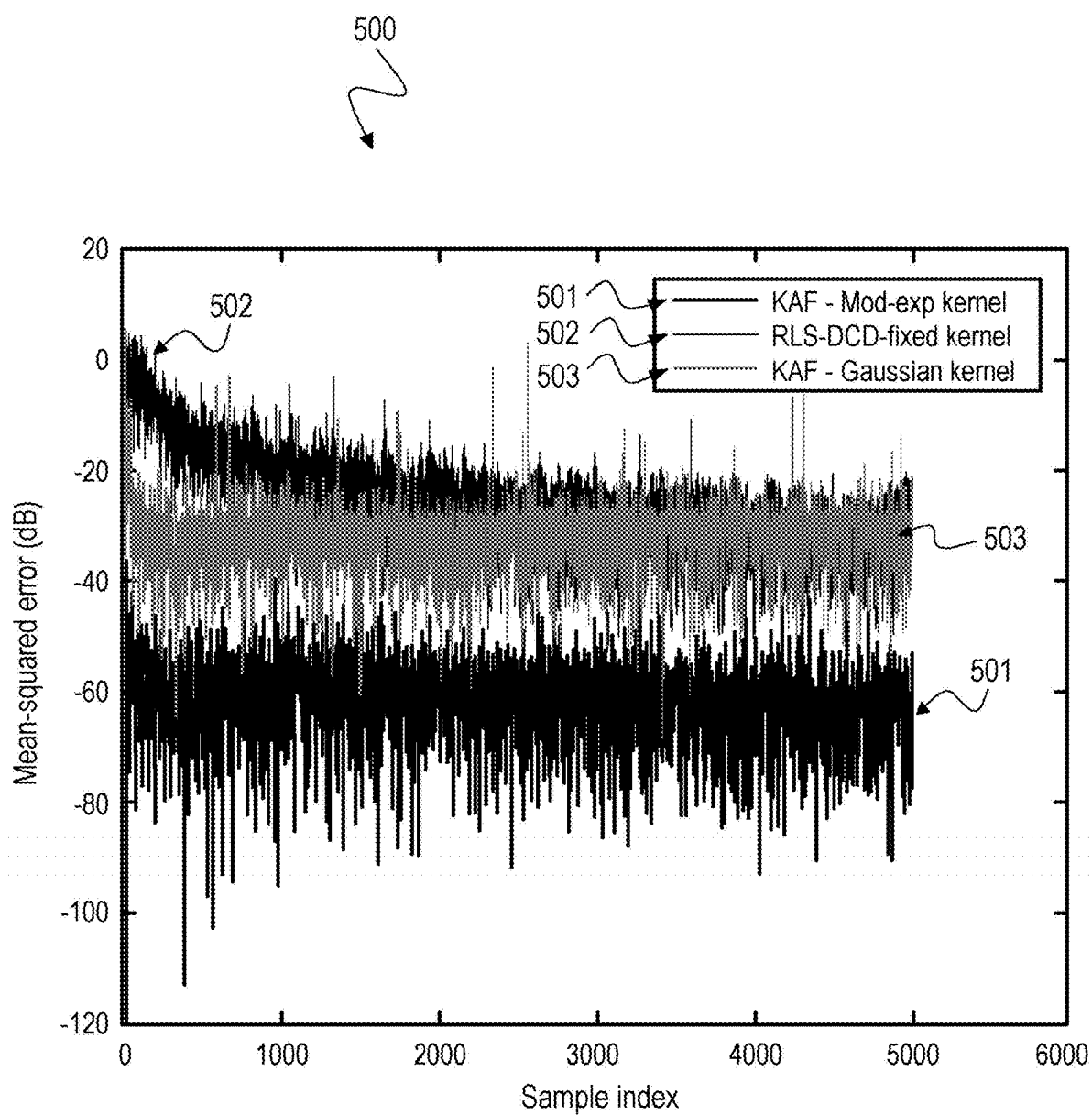
FIG. 5 is a performance diagram illustrating mean-squared error over time for the method 400 in comparison to other adaptive filtering methods.

FIG. 5 is a performance diagram 500 illustrating mean-squared error over time for the method 400 in comparison to other adaptive filtering methods. The diagram 500 illustrates the suppression performance of an OFDM signal passed through a power amplifier. The RLS-DCD 502 is a baseline algorithm that is used with fixed polynomial kernels as described above. The KAF performance using an RLS version of the above described algorithm or method 400 is shown with two different kernels. The first one 501 is with the disclosed mod-exp (modified exponential) kernel and the second one 503 is with the Gaussian kernel as described above. The diagram 500 shows that the disclosed kernel 501 outperforms both other approaches 502, 503 in terms of suppression and convergence.

Hence, using techniques according to the disclosure provides very good suppression performance for full duplex with fast convergence. This also leads to a better system level performance, for example in a chipset implementation, at a cost comparable to existing systems.

Figure 6:
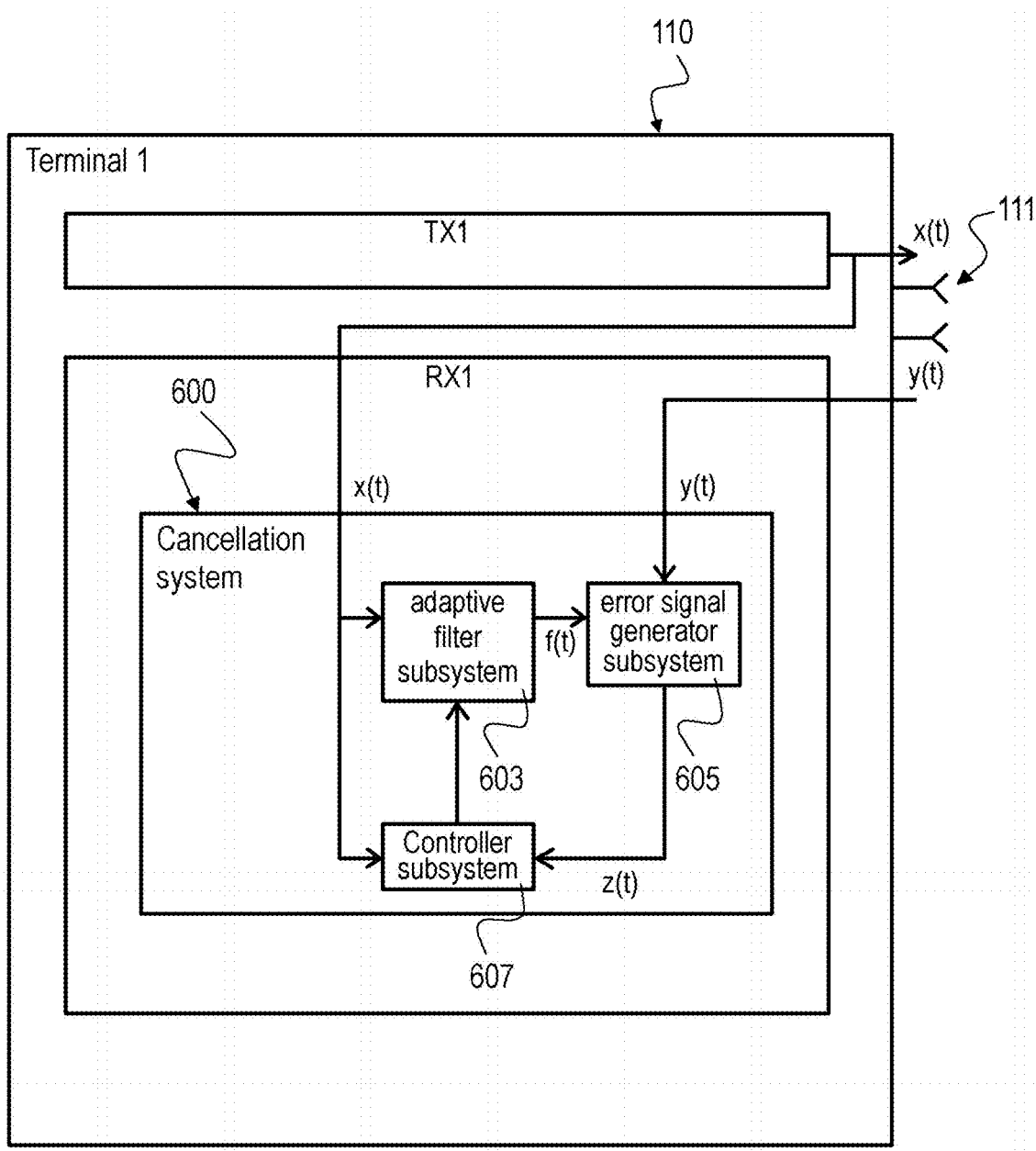
FIG. 6 is a block diagram of a cancellation system 600 in accordance with the disclosure implemented in a communication terminal 110.

FIG. 6 is a block diagram of a cancellation system 600 in accordance with the disclosure implemented in a communication terminal 110 as described above with respect to FIG. 1. The cancellation system 600 is used for cancelling interference caused by a non-linear device, e.g. from the amplifiers of transmitter TX1 and/or receiver RX1 as described above with respect to FIG. 1. The cancellation system 600 includes an adaptive filter subsystem 603, an error signal generator subsystem 605 and a controller subsystem 607. The adaptive filter subsystem 603 is coupled in parallel to the non-linear device such that the transmit signal x(t) transmitted by the transmitter TX1 is input to the adaptive filter subsystem 603. The adaptive filter subsystem 603 filters the input signal of the non-linear device, that is the transmit signal x(t), to generate an approximation signal f(t) approximating an output signal of the non-linear device, that is the receive signal y(t) received by the receiver RX1. The error signal generator subsystem 605 generates an error signal z(t) based on a function of the output signal y(t) and the approximation signal f(t). The controller subsystem 607 adjusts the adaptive filter subsystem 603 based on the error signal z(t) and a phase and magnitude relation of the output signal y(t) and the input signal x(t) as described above with respect to the controller 207 in FIG. 2. The cancellation system 600 may be implemented on a chip, e.g. a baseband chip of the communication terminal 110.

The methods, systems and devices described herein may be implemented as software in a Digital Signal Processor (DSP), in a micro-controller or in any other side-processor or as hardware circuit on a chip or within an application specific integrated circuit (ASIC). Embodiments described in this disclosure can be implemented in digital electronic circuitry, or in computer hardware, firmware, software, or in combinations thereof, e.g. in available hardware of mobile devices or in new hardware dedicated for processing the methods described herein.

The present disclosure also supports a computer program product including computer executable code or computer executable instructions that, when executed, causes at least one computer to execute the performing and computing blocks described herein, in particular the method 400 as described above with respect to FIG. 4 and the components of the cancellation devices 200, 300 as described above with respect to FIGS. 2 and 3. Such a computer program product may include a readable non-transitory storage medium storing program code thereon for use by a processor, the program code comprising instructions for performing the method 400 as described above with respect to FIG. 4 or any of the components of the cancellation devices 200, 300 described above with respect to FIGS. 2 and 3.

EXAMPLES

The following examples pertain to further embodiments. Example 1 is a cancellation device for cancelling interference caused by a non-linear device, the cancellation device comprising: an adaptive filter coupled in parallel to the non-linear device, wherein the adaptive filter is configured to filter an input signal of the non-linear device to generate an approximation signal approximating an output signal of the non-linear device; an error signal generator configured to generate an error signal based on a function of the output signal and the approximation signal; and a controller configured to adjust the adaptive filter based on the error signal and a phase and magnitude relation of the output signal and the input signal.

In Example 2, the subject matter of Example 1 can optionally include that the phase and magnitude relation comprises a phase relation of the output signal versus the input signal.

In Example 3, the subject matter of any one of Examples 1-2 can optionally include that the phase relation comprises an angle between the input signal and the output signal.

In Example 4, the subject matter of Example 2 can optionally include that the phase relation comprises a real or imaginary part of a product of the input signal and the conjugate complex output signal.

In Example 5, the subject matter of any one of Examples 1-4 can optionally include that the phase and magnitude relation comprises a magnitude relation of the input signal and the output signal.

In Example 6, the subject matter of Example 5 can optionally include that the magnitude relation comprises a magnitude of a product of the input signal and the conjugate complex output signal.

In Example 7, the subject matter of Example 6 can optionally include that the magnitude relation comprises an exponential function of the magnitude of the product of the input signal and the conjugate complex output signal.

In Example 8, the subject matter of any one of Examples 1-7 can optionally include that the phase and magnitude relation comprises a multiplicative combination of a phase function of the output signal and the input signal and a magnitude function of the output signal and the input signal.

In Example 9, the subject matter of any one of Examples 1-8 can optionally include that the phase and magnitude relation comprises a continuous symmetric positive-definite function of the output signal and the input signal.

In Example 10, the subject matter of any one of Examples 1-9 can optionally include that the phase and magnitude relation comprises a kernel function of the input signal and the output signal.

In Example 11, the subject matter of Example 10 can optionally include that the kernel function is a function of a complex-valued input signal and a complex-valued output signal.

In Example 12, the subject matter of any one of Examples 10-11 can optionally include that the kernel function of the input signal x and the output signal y is: $\kappa(x,y)=\text{real}(xy^*)\exp(\beta|xy^*|)$.

In Example 13, the subject matter of any one of Examples 1-12 can optionally include that the adaptive filter comprises a Kernel Adaptive Filter.

In Example 14, the subject matter of any one of Examples 1-13 can optionally include that the controller is configured to adjust the adaptive filter based on one of a recursive least squares (RLS) or a least mean squares (LMS) algorithm or any other algorithm usable for weight optimization in adaptive filter theory.

In Example 15, the subject matter of any one of Examples 1-14 can optionally include that the input signal comprises an orthogonal frequency division multiplex (OFDM) signal.

In Example 16, the subject matter of any one of Examples 1-15 can optionally include that the non-linear device comprises a power amplifier.

In Example 17, the subject matter of any one of Examples 1-16 can optionally include that the interference caused by the non-linear device comprises at least one of amplitude modulation (AM)-amplitude modulation (AM) or amplitude modulation (AM)-phase modulation (PM) distortion.

Example 18 is a cancellation device for cancelling interference caused by a non-linear device, the cancellation device comprising: a kernel adaptive filter (KAF) coupled in parallel to the non-linear device, wherein the KAF is configured to filter an input signal of the non-linear device to generate an approximation signal approximating an output signal of the non-linear device; an error signal generation circuit configured to generate an error signal based on a function of the output signal of the non-linear device and the approximation signal; and a controller configured to adjust the KAF based on an adaptive algorithm depending on the error signal and a kernel function of the input signal and the output signal.

In Example 19, the subject matter of Example 18 can optionally include that the kernel function is a function of complex-valued input and output signals.

In Example 20, the subject matter of any one of Examples 18-19 can optionally include that the kernel function comprises a first part which is based on a phase between the input signal and the output signal and a second part which is based on a magnitude of the output signal and a magnitude of the input signal.

In Example 21, the subject matter of any one of Examples 18-20 can optionally include that the kernel function of the input signal x and the output signal y is: $\kappa(x,y)=\text{real}(xy^*)\exp(\beta|xy^*|)$.

Example 22 is a method for cancelling interference caused by a non-linear device, the method comprising: filtering an input signal of the non-linear device by an adaptive filter to generate an approximation signal approximating an output signal of the non-linear device; generating an error signal based on a function of the output signal and the approximation signal; and adjusting the adaptive filter based on the error signal and a phase and magnitude relation of the output signal and the input signal.

In Example 23, the subject matter of Example 22 can optionally include that the phase and magnitude relation comprises a function of a product of the input signal and the conjugate complex output signal.

In Example 24, the subject matter of any one of Examples 22-23 can optionally include that the phase and magnitude relation comprises a kernel function of the input signal and the output signal.

In Example 25, the subject matter of Example 24 can optionally include that the kernel function is a function of a complex-valued input signal and a complex-valued output signal.

In Example 26, the subject matter of any one of Examples 24-25 can optionally include that the kernel function of the input signal x and the output signal y is: $\kappa(x,y)=\text{real}(xy^*)\exp(\beta|xy^*|)$.

Example 27 is a method for cancelling interference caused by a non-linear device, the method comprising: filtering an input signal of the non-linear device by a kernel adaptive filter (KAF) to generate an approximation signal approximating an output signal of the non-linear device; subtracting an output signal of the KAF from an output signal of the non-linear device to generate an error signal; and adjusting the KAF based on an adaptive algorithm depending on the error signal and a kernel function of the input signal and the output signal.

In Example 28, the subject matter of Example 27 can optionally include that the kernel function is a function of complex-valued input and output signals.

In Example 29, the subject matter of any one of Examples 27-28 can optionally include that the kernel function comprises a first part which is based on a phase between the input signal and the output signal and a second part which is based on a magnitude of the output signal and a magnitude of the input signal.

In Example 30, the subject matter of any one of Examples 27-29 can optionally include that the kernel function of the input signal x and the output signal y is: $\kappa(x,y)=\text{real}(xy^*)\exp(\beta|xy^*|)$.

Example 31 is a computer readable non-transitory medium on which computer instructions are stored which when executed by a computer, cause the computer to perform the subject matter of any one of Examples 22-30.

Example 32 is a cancellation system for cancelling interference caused by a non-linear device, the cancellation system comprising: an adaptive filter subsystem coupled in parallel to the non-linear device, wherein the adaptive filter subsystem is configured to filter an input signal of the non-linear device to generate an approximation signal approximating an output signal of the non-linear device; an error signal generator subsystem configured to generate an error signal based on a function of the output signal and the approximation signal; and a controller subsystem configured to adjust the adaptive filter subsystem based on the error signal and a phase and magnitude relation of the output signal and the input signal.

In Example 33, the subject matter of Example 32 can optionally include that the phase and magnitude relation comprises a phase relation of the output signal versus the input signal.

Example 34 is a device for cancelling interference caused by a non-linear device, the device comprising: means for filtering an input signal of the non-linear device by an adaptive filter to generate an approximation signal approximating an output signal of the non-linear device; means for generating an error signal based on a function of the output signal and the approximation signal; and means for adjusting the adaptive filter based on the error signal and a phase and magnitude relation of the output signal and the input signal.

In Example 35, the subject matter of Example 34 can optionally include that the phase and magnitude relation comprises a function of a product of the input signal and the conjugate complex output signal.

In Example 36, the subject matter of any one of Examples 34-35 can optionally include that the phase and magnitude relation comprises a kernel function of the input signal and the output signal.

In Example 37, the subject matter of Example 36 can optionally include that the kernel function is a function of a complex-valued input signal and a complex-valued output signal.

In Example 38, the subject matter of any one of Examples 36-37 can optionally include that the kernel function of the input signal x and the output signal y is: $\kappa(x,y) = \text{real}(xy^*) \exp(\beta|xy^*|)$.

Example 39 is a device for cancelling interference caused by a non-linear device, the device comprising: means for filtering an input signal of the non-linear device by a kernel adaptive filter (KAF) to generate an approximation signal approximating an output signal of the non-linear device; means for generating an error signal based on a function of the output signal of the non-linear device and the approximation signal; and means for adjusting the KAF based on an adaptive algorithm depending on the error signal and a kernel function of the input signal and the output signal.

In Example 40, the subject matter of Example 39 can optionally include that the kernel function is a function of complex-valued input and output signals.

In Example 41, the subject matter of any one of Examples 10-11 can optionally include that the kernel function of the input signal x and the output signal y is $g_1(xy^*)g_2(|xy^*|)$, where $g_1$ and $g_2$ are continuous functions.

In Example 42, the subject matter of any one of Examples 18-19 can optionally include that the kernel function of the input signal x and the output signal y is $g_1(xy^*)g_2(|xy^*|)$, where $g_1$ and $g_2$ are continuous functions.

In Example 43, the subject matter of any one of Examples 24-25 can optionally include that the kernel function of the input signal x and the output signal y is $g_1(xy^*)g_2(|xy^*|)$, where $g_1$ and $g_2$ are continuous functions.

In Example 44, the subject matter of any one of Examples 27-28 can optionally include that the kernel function of the input signal x and the output signal y is $g_1(xy^*)g_2(|xy^*|)$, where $g_1$ and $g_2$ are continuous functions.

In Example 45, the subject matter of any one of Examples 36-37 can optionally include that the kernel function of the input signal x and the output signal y is $g_1(xy^*)g_2(|xy^*|)$, where $g_1$ and $g_2$ are continuous functions.

In addition, while a particular feature or aspect of the disclosure may have been disclosed with respect to only one of several implementations, such feature or aspect may be combined with one or more other features or aspects of the other implementations as may be desired and advantageous for any given or particular application. Furthermore, to the extent that the terms "include", "have", "with", or other variants thereof are used in either the detailed description or the claims, such terms are intended to be inclusive in a manner similar to the term "comprise". Furthermore, it is understood that aspects of the disclosure may be implemented in discrete circuits, partially integrated circuits or fully integrated circuits or programming means. Also, the terms "exemplary", "for example" and "e.g." are merely meant as an example, rather than the best or optimal.

Although specific aspects have been illustrated and described herein, it will be appreciated by those of ordinary skill in the art that a variety of alternate and/or equivalent implementations may be substituted for the specific aspects shown and described without departing from the scope of the present disclosure. This application is intended to cover any adaptations or variations of the specific aspects discussed herein.

Although the elements in the following claims are recited in a particular sequence with corresponding labeling, unless the claim recitations otherwise imply a particular sequence for implementing some or all of those elements, those elements are not necessarily intended to be limited to being implemented in that particular sequence.

The invention claimed is:

1. A cancellation device for cancelling interference caused by a non-linear device, the cancellation device comprising:
   an adaptive filter coupled in parallel to the non-linear device, wherein the adaptive filter is configured to filter an input signal of the non-linear device to generate an approximation signal approximating an output signal of the non-linear device;
   an error signal generator configured to generate an error signal based on a function of the output signal and the approximation signal; and
   a controller configured to adjust the adaptive filter based on the error signal and a phase and magnitude relation of the output signal and the input signal.

2. The cancellation device of claim 1,
   wherein the phase and magnitude relation comprises a phase relation of the output signal versus the input signal.

3. The cancellation device of claim 2,
   wherein the phase relation comprises an angle between the input signal and the output signal.

4. The cancellation device of claim 2,
   wherein the phase relation comprises a real or imaginary part of a product of the input signal and a conjugate complex output signal.

5. The cancellation device of claim 1,
wherein the phase and magnitude relation comprises a magnitude relation of the input signal and the output signal.

6. The cancellation device of claim 5,
wherein the magnitude relation comprises a magnitude of a product of the input signal and a conjugate complex output signal.

7. The cancellation device of claim 6,
wherein the magnitude relation comprises an exponential function of the magnitude of the product of the input signal and the conjugate complex output signal.

8. The cancellation device of claim 1,
wherein the phase and magnitude relation comprises a multiplicative combination of a phase function of the output signal and the input signal and a magnitude function of the output signal and the input signal.

9. The cancellation device of claim 1,
wherein the phase and magnitude relation comprises a continuous symmetric positive-definite function of the output signal and the input signal.

10. The cancellation device of claim 1,
wherein the phase and magnitude relation comprises a kernel function of the input signal and the output signal.

11. The cancellation device of claim 10,
wherein the kernel function is a function of a complex-valued input signal and a complex-valued output signal.

12. The cancellation device of claim 10,
wherein the kernel function of the input signal x and the output signal y is:
$K(x, y) = \text{real}(xy^*)\exp(\beta|xy^*|)$.

13. The cancellation device of claim 1,
wherein the adaptive filter comprises a Kernel Adaptive Filter.

14. The cancellation device of claim 1,
wherein the controller is configured to adjust the adaptive filter based on one of a recursive least squares (RLS) or a least mean squares (LMS) algorithm or any other algorithm usable for weight optimization in adaptive filter theory.

15. The cancellation device of claim 1,
wherein the input signal comprises an orthogonal frequency division multiplex (OFDM) signal.

16. The cancellation device of claim 1,
wherein the non-linear device comprises a power amplifier.

17. The cancellation device of claim 1,
wherein the interference caused by the non-linear device comprises at least one of amplitude modulation (AM)—amplitude modulation (AM) or amplitude modulation (AM)—phase modulation (PM) distortion.

18. A cancellation device for cancelling interference caused by a non-linear device, the cancellation device comprising:
a kernel adaptive filter (KAF) coupled in parallel to the non-linear device, wherein the KAF is configured to filter an input signal of the non-linear device to generate an approximation signal approximating an output signal of the non-linear device;
an error signal generation circuit configured to generate an error signal based on a function of the output signal of the non-linear device and the approximation signal; and
a controller configured to adjust the KAF based on an adaptive algorithm depending on the error signal and a kernel function of the input signal and the output signal.

19. The cancellation device of claim 18,
wherein the kernel function is a function of complex-valued input and output signals.

20. The cancellation device of claim 18,
wherein the kernel function comprises a first part which is based on a phase between the input signal and the output signal and a second part which is based on a magnitude of the output signal and a magnitude of the input signal.

21. The cancellation device of claim 18,
wherein the kernel function of the input signal x and the output signal y is:
$K(x, y) = \text{real}(xy^*)\exp(\beta|xy^*|)$.

22. The cancellation device of claim 18,
wherein the kernel function of the input signal x and the output signal y is $g_1(xy^*) g_2(|xy|)$, where $g_1$ and $g_2$ are continuous functions.

23. A method for cancelling interference caused by a non-linear device, the method comprising:
filtering an input signal of the non-linear device by an adaptive filter to generate an approximation signal approximating an output signal of the non-linear device;
generating an error signal based on a function of the output signal and the approximation signal; and
adjusting the adaptive filter based on the error signal and a phase and magnitude relation of the output signal and the input signal.

24. The method of claim 23,
wherein the phase and magnitude relation comprises a function of a product of the input signal and a conjugate complex output signal.

25. The method of claim 23,
wherein the phase and magnitude relation comprises a kernel function of the input signal and the output signal.

* * * * *